US012731704B2

(12) United States Patent
Hori et al.

(10) Patent No.: US 12,731,704 B2
(45) Date of Patent: Sep. 8, 2026

(54) MULTICORE CABLE

(71) Applicant: SUMITOMO ELECTRIC INDUSTRIES, LTD., Osaka (JP)

(72) Inventors: Kenji Hori, Tochigi (JP); Takumi Ooshima, Tochigi (JP); Takashi Yabe, Tochigi (JP); Ryota Fukumoto, Osaka (JP); Yutaka Matsumura, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 195 days.

(21) Appl. No.: 18/754,684

(22) Filed: Jun. 26, 2024

(65) Prior Publication Data

US 2025/0079043 A1    Mar. 6, 2025

(30) Foreign Application Priority Data

Sep. 6, 2023 (JP) ................................ 2023-144599

(51) Int. Cl.
*H01B 7/28* (2006.01)
*H01B 7/00* (2006.01)

(52) U.S. Cl.
CPC ............ *H01B 7/28* (2013.01); *H01B 7/0009* (2013.01)

(58) Field of Classification Search
CPC . H01B 7/009; H01B 7/17; H01B 7/22; H01B 7/28; H01B 7/041; H01B 11/02; H01B 13/02
USPC .......... 174/102 R, 108, 109 R, 110 R–113 R
See application file for complete search history.

(56) References Cited

U.S. PATENT DOCUMENTS

| | | | | |
|---|---|---|---|---|
| 343,082 | A * | 6/1886 | Smith et al. | H01B 11/02 174/102 R |
| 8,143,522 | B2 * | 3/2012 | Laudenslager | H01B 11/085 174/113 R |
| 8,921,698 | B2 * | 12/2014 | Vander Lind | H02G 11/00 174/102 R |
| 2014/0069683 | A1 * | 3/2014 | Tanaka | H01B 7/0009 174/107 |
| 2017/0236616 | A1 * | 8/2017 | Hayashishita | H01B 7/0009 174/350 |
| 2018/0151272 | A1 * | 5/2018 | Watanabe | H01B 7/048 |
| 2022/0084719 | A1 * | 3/2022 | Moriyama | H01B 11/1033 |
| 2023/0048028 | A1 * | 2/2023 | Tanaka | H01B 11/02 |

FOREIGN PATENT DOCUMENTS

| | | | | |
|---|---|---|---|---|
| JP | 2013171672 A * | 9/2013 | | H01B 11/20 |
| JP | 2022-040960 | 3/2022 | | |

* cited by examiner

*Primary Examiner* — William H. Mayo, III
(74) *Attorney, Agent, or Firm* — IPUSA, PLLC

(57) ABSTRACT

A multicore cable includes an oil absorptive interposition, and a core disposed to surround the oil absorptive interposition and including electrical wires. The electrical wires are twisted together. In a cross-section perpendicular to a longitudinal direction of the core, the core has layers in which the electrical wires are arranged on circumferences, and an innermost layer of the layers is closest to the oil absorptive interposition. A twist pitch of the electrical wires in the innermost layer is greater than or equal to 0.45 times and less than 0.8 times a twist pitch of the electrical wires in an outermost layer of the layers.

5 Claims, 4 Drawing Sheets

MULTICORE CABLE

CROSS REFERENCE TO RELATED APPLICATIONS

This application claims priority based on Japanese Patent Application No. 2023-144599 filed on Sep. 6, 2023, and the entire contents of the Japanese patent application are incorporated herein by reference.

TECHNICAL FIELD

The present disclosure relates to a multicore cable.

BACKGROUND

Patent literature 1 (Japanese Unexamined Patent Application Publication No. 2022-040960) discloses a core wire for a multicore cable including a conductor formed by twisting a plurality of element wires, a first insulating film covering an outer periphery of the conductor and containing a polyethylene-based resin, and a second insulating film provided in contact with an outer periphery of the first insulating film and containing a copolymer of ethylene and α-olefin having a carbonyl group.

SUMMARY

A multicore cable of the present disclosure includes an oil absorptive interposition, and a core disposed to surround the oil absorptive interposition and including electrical wires, the electrical wires being twisted together. In a cross-section perpendicular to a longitudinal direction of the core, the core has layers in which the electrical wires are arranged on circumferences, and an innermost layer of the layers is closest to the oil absorptive interposition. A twist pitch of the electrical wires in the innermost layer is greater than or equal to 0.45 times and less than 0.8 times a twist pitch of the electrical wires in an outermost layer of the layers.

DETAILED DESCRIPTION

Figure 1:
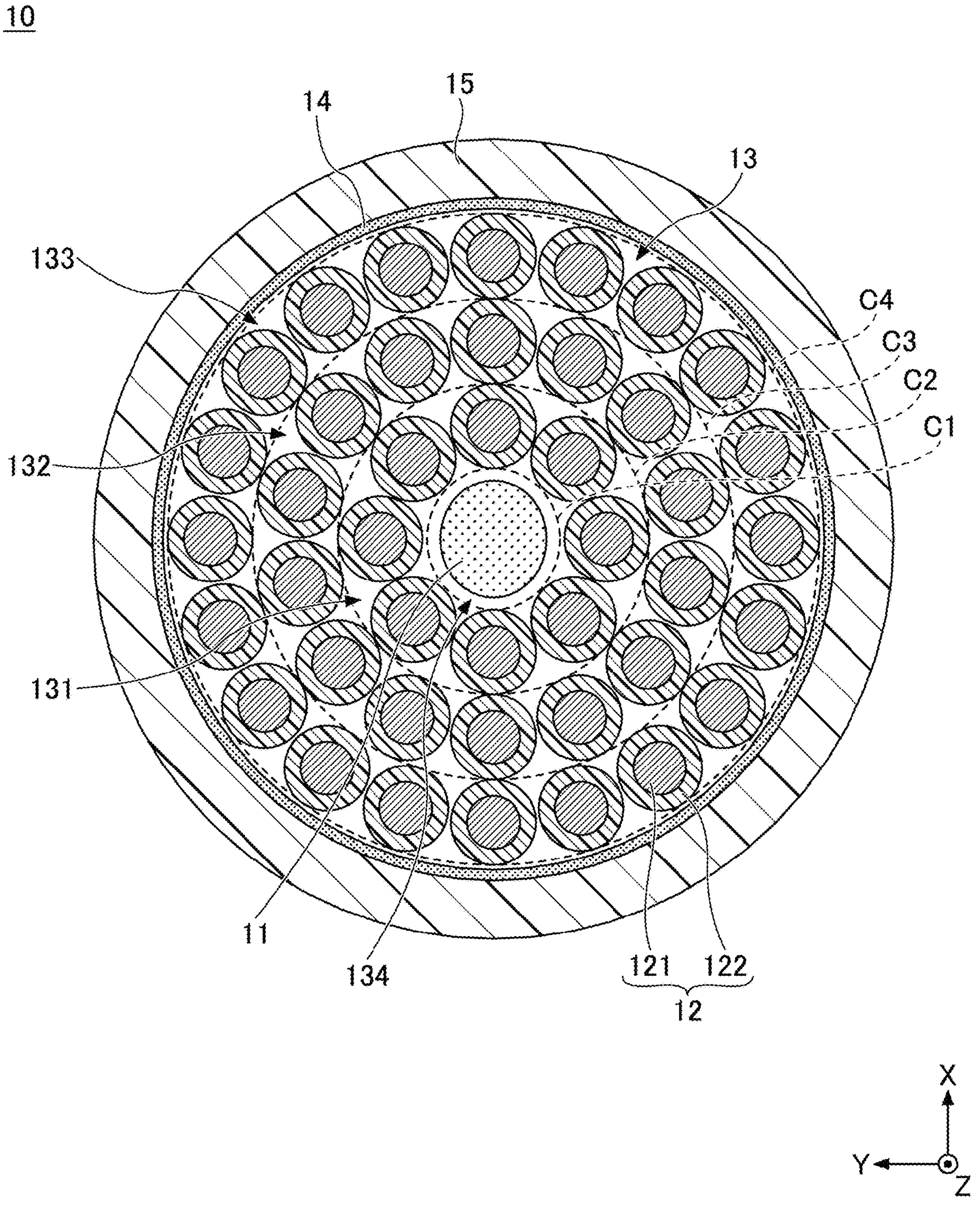
FIG. 1 is a cross-sectional view of a multicore cable according to an embodiment of the present disclosure in a plane perpendicular to a longitudinal direction of the multicore cable.

A multicore cable used in a factory or the like may be disposed in a drive unit or the like. In addition, oil or the like may adhere to the multicore cable in a factory. Therefore, the multicore cable used in a factory or the like is required to have flexing resistance and oil resistance.

Therefore, an object of the present disclosure is to provide a multicore cable having flexing resistance and oil resistance.

According to the present disclosure, a multicore cable having flexing resistance and oil resistance can be provided.

Embodiments will be described below.

Description of Embodiments of Present Disclosure

First, embodiments of the present disclosure will be listed and described. In the following description, the same or corresponding elements are denoted by the same reference numerals, and the same description thereof will not be repeated.

(1) A multicore cable according to an aspect of the present disclosure includes an oil absorptive interposition, and a core disposed to surround the oil absorptive interposition and including electrical wires, the electrical wires being twisted together. In a cross-section perpendicular to a longitudinal direction of the core, the core has layers in which the electrical wires are arranged on circumferences, and an innermost layer of the layers is closest to the oil absorptive interposition. A twist pitch of the electrical wires in the innermost layer is greater than or equal to 0.45 times and less than 0.8 times a twist pitch of the electrical wires in an outermost layer of the layers.

The multicore cable according to an aspect of the present disclosure includes the oil absorptive interposition, and thus the oil absorptive interposition can absorb oil that has adhered to the multicore cable and that has entered the inside. Therefore, even when oil enters the inside of the multicore cable, it is possible to suppress a decrease in the insulation resistance of the electrical wires included in the multicore cable and to increase the oil resistance.

By setting the twist pitch of the electrical wires in the innermost layer to be 0.45 times or more the twist pitch of the electrical wires in the outermost layer, a sufficient gap that allows oil to easily permeate can be formed between the electrical wires in the innermost layer. Therefore, the oil reaching the innermost layer can be easily absorbed by the oil absorptive interposition, and the oil resistance of the multicore cable can be increased.

In addition, by setting the twist pitch of the electrical wires in the innermost layer to be less than 0.8 times the twist pitch of the electrical wires in the outermost layer, the flexing resistance of the multicore cable can be increased.

(2) In the above (1), the electrical wires may each include a conductor and an insulator covering the conductor. The insulator may contain a resin material whose main component is a polyvinyl chloride or a polyolefin.

When the insulator contains a polyvinyl chloride or a polyolefin as a main component of the resin material, the flexibility of the electrical wire or the flexibility of the multicore cable including the electrical wires is increased, and the cost can be reduced as compared with the case where a fluororesin or the like is used as the resin material. By increasing the flexibility of the electrical wire or the multicore cable, the flexing resistance of the multicore cable is also increased.

(3) In the above (1) or (2), the core may have three or more of the layers made up of the electrical wires. A twist pitch of the electrical wires in an intermediate layer may be greater than or equal to 0.7 times and less than 0.95 times the twist pitch of the electrical wires in the outermost layer, the intermediate layer being adjacent to the outermost layer and being disposed at a position closer to the oil absorptive interposition than the outermost layer is.

By setting the twist pitch of the electrical wires in the intermediate layer to be 0.7 times or more the twist pitch of the electrical wires in the outermost layer, a sufficient gap that allows oil to easily enter can be formed between the electrical wires in the intermediate layer. Therefore, the oil reaching the intermediate layer can be further allowed to enter the inside of the core and be easily absorbed by the oil absorptive interposition, and the oil resistance of the multicore cable can be increased.

In addition, by setting the twist pitch of the electrical wires in the intermediate layer to be less than 0.95 times the twist pitch of the electrical wires in the outermost layer, the flexing resistance of the multicore cable can be increased.

(4) In any one of the above (1) to (3), the multicore cable may further include an outer sheath covering the core. The outer sheath may contain a resin material whose main component is a polyvinyl chloride or a polyolefin.

Since the multicore cable includes the outer sheath, the electrical wires included in the core disposed inside the outer sheath are protected, and the durability is increased.

The outer sheath contains a polyvinyl chloride or a polyolefin as a main component of the resin material, and thus the flexibility of the multicore cable is increased, and the cost can be reduced as compared with a case where a fluororesin or the like is used as the resin material. By increasing the flexibility of the multicore cable, the flexing resistance of the multicore cable is also increased.

(5) In the above (4), the multicore cable may include a suppression wound layer between the core and the outer sheath. The suppression wound layer may include an oil absorptive tape.

By providing the suppression wound layer between the core and the outer sheath, the core and the outer sheath can be prevented from being in direct contact with each other. Therefore, when the electrical wire is taken out at the end portion of the multicore cable in the longitudinal direction, the outer sheath can be easily peeled off.

The suppression wound layer includes the oil absorptive tape, and thus it is possible to suppress the oil that has entered the multicore cable from further entering the inside and coming into contact with the electrical wires. Therefore, it is possible to suppress a decrease in the insulation resistance of the electrical wires included in the multicore cable and to increase the oil resistance.

(6) In the above (5), the multicore cable may further include a metal shielding layer between the outer sheath and the suppression wound layer.

The multicore cable includes the metal shielding layer, and thus it is possible to suppress signal leakage to the outside and radio wave intrusion from the outside while increasing the flexing resistance of the multicore cable. In addition, the multicore cable includes the metal shielding layer, and thus the multicore cable can shield against heat from the outside and protect the core from the outside heat. Furthermore, the multicore cable includes the metal shielding layer, so that the core can be mechanically protected even when the outer sheath is damaged.

Details of Embodiments of Present Disclosure

A specific example of a multicore cable according to an embodiment of the present disclosure (hereinafter, referred to as "the embodiment") will be described below with reference to the drawings. The present invention is not limited to these examples, but is defined by the scope of the claims, and is intended to include all modifications within the meaning and scope equivalent to the scope of the claims.

[Multicore Cable]

Figure 2:
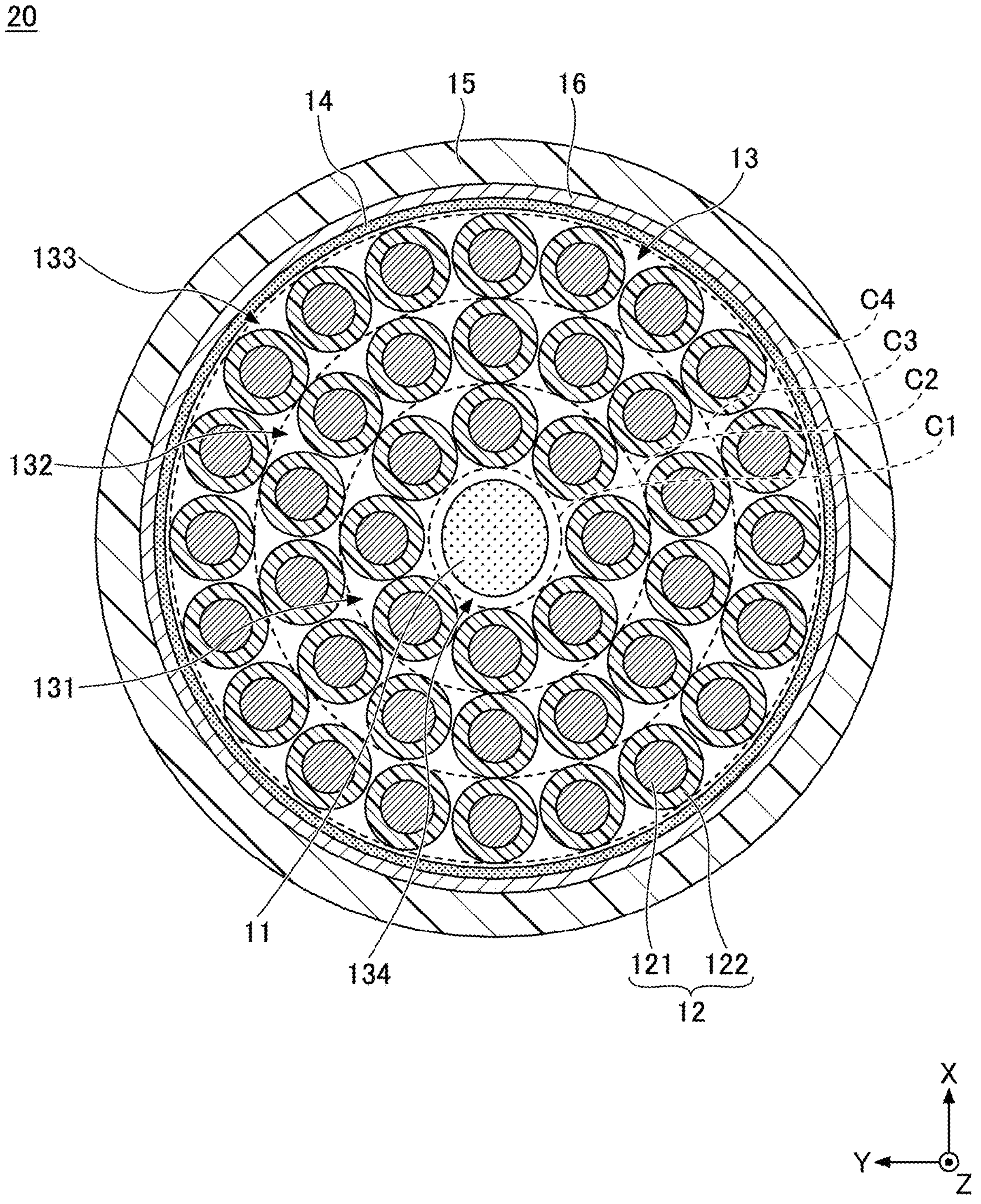
FIG. 2 is a cross-sectional view of a multicore cable according to another embodiment of the present disclosure in a plane perpendicular to a longitudinal direction of the multicore cable.
Figure 3:
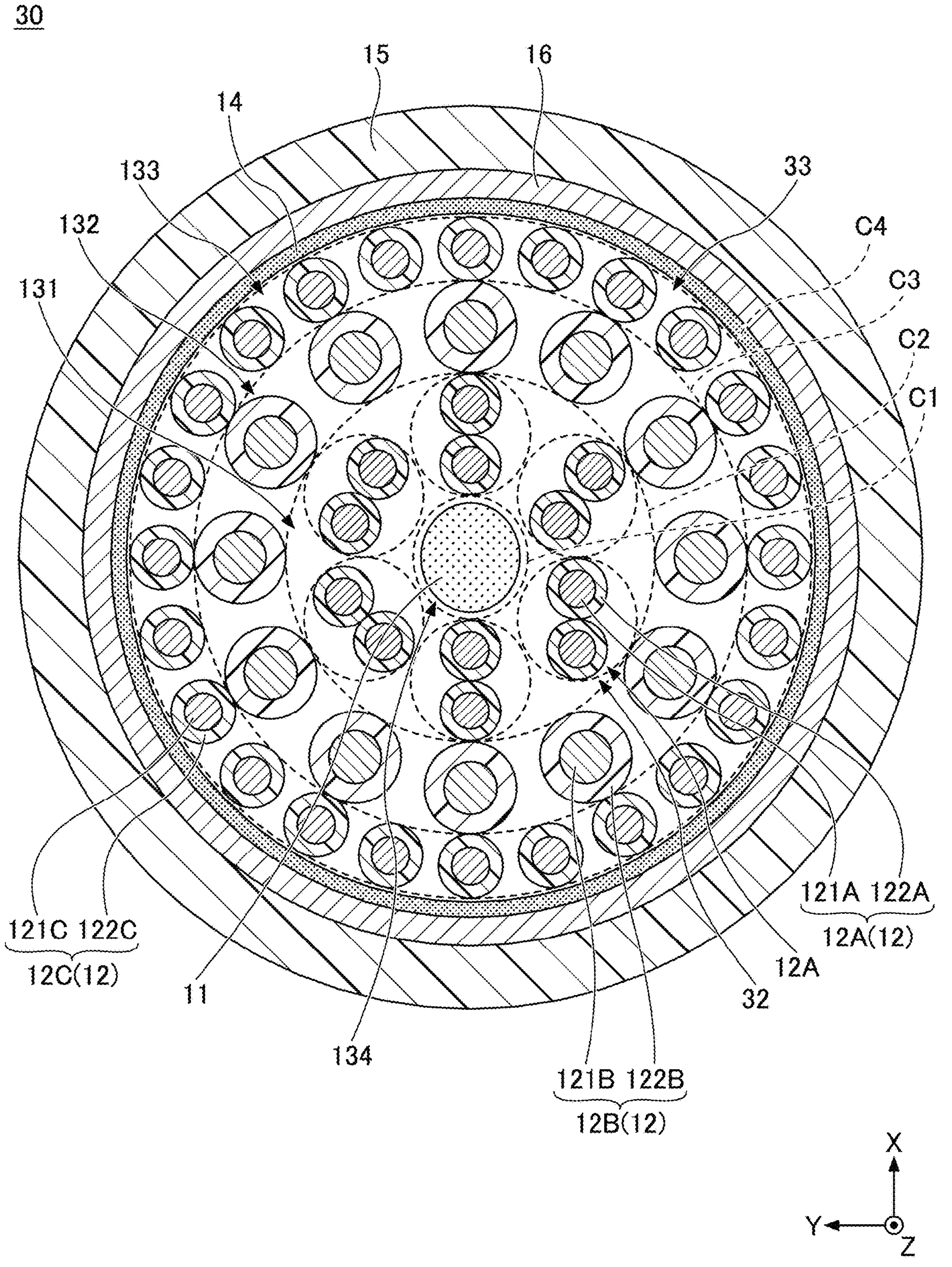
FIG. 3 is a cross-sectional view of a multicore cable according to yet another embodiment of the present disclosure in a plane perpendicular to a longitudinal direction of the multicore cable.

FIG. 1 illustrates a schematic view of a cross-section perpendicular to a longitudinal direction of a multicore cable of the embodiment. FIGS. 2 and 3 each illustrate a schematic view of a cross-section perpendicular to a longitudinal direction of a multicore cable according to another configuration example of the embodiment. In each of FIGS. 1, 2 and 3, the longitudinal direction of the multicore cable indicates a direction along the Z-axis, that is, an axis perpendicular to the paper surface, for example. FIGS. 1, 2, and 3 illustrate cross-sections in the XY plane perpendicular to the Z axis.

Since FIGS. 2 and 3 are illustrations of other configuration examples of the multicore cables of the embodiments, the explanation will be made mainly using FIG. 1, and the explanations will be made using FIGS. 2 and 3 as necessary.

As illustrated in FIG. 1, a multicore cable 10 of the embodiment can be configured so as to include an oil absorptive interposition 11 and a core 13 which is disposed so as to surround oil absorptive interposition 11 and includes a plurality of electrical wires 12 twisted together.

(1) Each Member Included in Multicore Cable

Each member included in the multicore cable of the embodiment will be described.

(1-1) Oil Absorptive Interposition

Multicore cable 10 of the embodiment can be configured so as to include oil absorptive interposition 11. Oil absorptive interposition 11 is an interposition capable of absorbing oil, and is an interposition capable of absorbing oil of 10 times or more of its own weight when immersed in oil.

A material used for oil absorptive interposition 11 is not particularly limited, but oil absorptive interposition 11 can be configured so as to contain one or more kinds of fibers selected from staple yarns, cotton, kapok-fibers, and the like.

Oil absorptive interposition 11 can be disposed to be surrounded by core 13 and can be disposed in a gap 134 of core 13. Gap 134 in which oil absorptive interposition 11 is to be disposed may be located inside core 13 which includes electrical wires 12 twisted together. For example, as illustrated in FIG. 1, gap 134 can be disposed in a central region including the center of core 13 in a cross-section perpendicular to the longitudinal direction of core 13. The multicore cable of the embodiment includes oil absorptive interposition 11, and thus oil absorptive interposition 11 can absorb oil that has adheres to multicore cable 10 and that has entered the inside. Therefore, even when oil enters the inside of multicore cable 10, it is possible to suppress a decrease in the insulation resistance of electrical wire 12 included in multicore cable 10 and to increase the oil resistance.

In this specification, the oil resistance indicates a property capable of suppressing a decrease in insulation resistance when multicore cable 10 is immersed in oil.

(1-2) Core

Core 13 has a configuration in which electrical wires 12 are twisted together. In a cross-section perpendicular to the longitudinal direction of core 13, core 13 has a configuration in which electrical wires 12 are arranged and twisted so that core 13 has a plurality of layers in which the plurality of electrical wires 12 are arranged on circumferences. Core 13 can have two or more layers made up of electrical wires 12 including an innermost layer 131 closest to oil absorptive interposition 11, and an outermost layer 133 farthest from oil absorptive interposition 11 and including the outer surface of core 13.

The electrical wires 12 being arranged so that core 13 has the plurality of layers in which the plurality of electrical wires 12 are arranged on the circumferences indicates that, as illustrated in FIG. 1, in a cross-section perpendicular to the longitudinal direction of core 13, each layer in which electrical wires 12 are arranged along the circumference of the circle is stacked such that the stacked layers together form a plurality of layers along the diameter of the circle. Core 13 of multicore cable 10 illustrated in FIG. 1 has three layers, i.e., innermost layer 131, an intermediate layer 132, and outermost layer 133. Innermost layer 131 has a structure in which electrical wires 12 are arranged along the circumference between a circle C1 and a circle C2. Intermediate layer 132 has a structure in which electrical wires 12 are arranged along the circumference between circle C2 and a circle C3. Outermost layer 133 has a structure in which electrical wires 12 are arranged along the circumference between circle C3 and a circle C4.

A twist pitch PI of electrical wires 12 in innermost layer 131 is preferably 0.45 times or more and less than 0.8 times a twist pitch PO of electrical wires 12 in outermost layer 133. That is, PI÷PO is preferably 0.45 or more and less than 0.8.

The twist pitch indicates a length in which electrical wires 12 constituting core 13, which is a twisted wire, are twisted once. The length indicates a length along the central axis of the twisted wire. The twist pitch can be measured in accordance with JIS C 3005 (2014).

When the twist pitch of electrical wires 12 in innermost layer 131 or intermediate layer 132 is measured, the measurement can be performed after electrical wires 12 of the other layer covering the innermost layer or the intermediate layer is removed so that the layer to be measured is exposed.

By setting the twist pitch PI of electrical wires 12 in innermost layer 131 to be 0.45 times or more the twist pitch PO of electrical wires 12 in outermost layer 133, a sufficient gap that allows oil to easily permeate can be formed between electrical wires 12 of innermost layer 131. Therefore, the oil reaching innermost layer 131 can be easily absorbed by oil absorptive interposition 11, and the oil resistance of multicore cable 10 can be increased.

In addition, by setting the twist pitch PI of electrical wires 12 in innermost layer 131 to be less than 0.8 times the twist pitch PO of electrical wires 12 in outermost layer 133, the flexing resistance of multicore cable 10 can be increased.

As illustrated in FIG. 1, core 13 can further include intermediate layer 132 in addition to innermost layer 131 and outermost layer 133, and may have three or more of the layers made up of electrical wires 12. Core 13 can be configured so as to include a plurality of layers as intermediate layers 132.

In core 13, intermediate layer 132 is a layer adjacent to outermost layer 133 and disposed at a position closer to oil absorptive interposition 11 than outermost layer 133 is, and a twist pitch PM of electrical wires 12 in intermediate layer 132 is preferably greater than or equal to 0.7 times and less than 0.95 times the twist pitch PO of electrical wires 12 in outermost layer 133. That is, PM÷PO is preferably 0.7 or more and less than 0.95.

By setting the twist pitch PM of electrical wires 12 in intermediate layer 132 to be 0.7 times or more the twist pitch PO of electrical wires 12 in outermost layer 133, a sufficient gap that allows oil to easily enter can be formed between electrical wires 12 of intermediate layer 132. Therefore, the oil reaching intermediate layer 132 can be further allowed to enter the inside of core 13 and be easily absorbed by oil absorptive interposition 11, and the oil resistance of multicore cable 10 can be increased.

In addition, by setting the twist pitch PM of electrical wires 12 in intermediate layer 132 to be less than 0.95 times the twist pitch PO of electrical wires 12 in outermost layer 133, the flexing resistance of multicore cable 10 can be increased.

(1-2-1) Electrical Wire

Electrical wires 12 included in core 13 of the multicore cable of the embodiment can each be configured so as to include a conductor 121 and an insulator 122 covering conductor 121. Thus, conductor 121 and insulator 122 will be described.

(A) Conductor

Conductor 121 can be a single conductor element wire or a plurality of conductor element wires. In a case where conductor 121 includes the plurality of conductor element wires, the plurality of conductor element wires may be twisted together. That is, in the case where conductor 121 includes the plurality of conductor element wires, conductor 121 may be a twisted wire of the plurality of conductor element wires.

A material used for conductor 121 is not particularly limited, and for example, one or more conductor materials selected from copper alloys, copper, silver-plated soft copper, and tin-plated soft copper can be used. As the copper, soft copper can be suitably used.

The cross-section area of conductor 121 is not particularly limited, but the cross-section area is preferably 0.05 $mm^2$ to 3 $mm^2$, for example.

(B) Insulator

Insulator 122 can cover an outer surface of conductor 121, specifically, an outer surface along the longitudinal direction of electrical wire 12, as illustrated in FIG. 1. Insulator 122 can be configured so as to include a resin material to be described below.

(Resin Material)

Insulator 122 can be configured so as to include a resin material. The resin material is not particularly limited, but it is preferable that the resin material contains, for example, a polyvinyl chloride or a polyolefin as a main component. The main component indicates a component which is contained in the greatest amount in mass ratio in the resin material.

When insulator 122 contains a polyvinyl chloride or a polyolefin as the main component of the resin material, the flexibility of electrical wire 12 or multicore cable 10 including electrical wire 12 is increased, and the cost can be reduced as compared with the case where fluororesin or the like is used as the resin material. By increasing the flexibility of electrical wire 12 and multicore cable 10, the flexing resistance of multicore cable 10 is also increased.

The polyolefin is not particularly limited. Examples of the polyolefin include polyethylene (PE), ethylene-vinyl acetate copolymer (EVA), ethylene-acrylic ester copolymers such as ethylene-ethyl acrylate copolymer (EEA), ethylene-α-olefin copolymer, ethylene-methyl acrylate copolymer, ethylene-butyl acrylate copolymer, ethylene-methyl methacrylate copolymer, ethylene-acrylic acid copolymer, partially saponified EVA, maleic anhydride-modified polyolefin, and ethylene-acrylic ester maleic anhydride copolymer. These resins may be used alone or in combination of two or more.

The resin material may be crosslinked or not crosslinked. However, when the resin material is crosslinked, the heat resistance, strength, and corrosion resistance of electrical wire 12 can be increased. Therefore, when electrical wire 12 is used for applications that require heat resistance, strength, or corrosion resistance, the resin material is preferably crosslinked.

(Additives)

Insulator 122 can be configured so as to contain additives such as a flame retardant, a flame retardant aid, an antioxidant, a lubricant, a coloring agent, a reflection-imparting agent, a masking agent, a processing stabilizer, and a plasticizer, in addition to the resin material.

(1-2-2) Configuration of Electrical Wire

The configuration of electrical wire 12 included in core 13 of the multicore cable of the embodiment is not particularly limited. For example, core 13 may be configured by a plurality of electrical wires 12 each having the same configuration such as size, as in multicore cable 10 and a multicore cable 20 illustrated in FIGS. 1 and 2.

Further, as in a multicore cable 30 illustrated in FIG. 3, a core 33 may be configured by a first electrical wire 12A, a second electrical wire 12B, and a third electrical wire 12C having different configurations such as sizes.

In multicore cable 30 illustrated in FIG. 3, first electrical wire 12A has a first conductor 121A and a first insulator 122A, second electrical wire 12B has a second conductor 121B and a second insulator 122B, and third electrical wire 12C has a third conductor 121C and a third insulator 122C. The preferred configurations of the conductors and the insulators have been described above, and thus the description thereof will be omitted.

As in multicore cable 30 illustrated in FIG. 3, two first electrical wires 12A can be twisted to form a twisted pair electrical wire 32, and then twisted with other electrical wires 12 to form core 33. Although FIG. 3 illustrates an example in which twisted pair electrical wire 32 is formed using first electrical wires 12A, the twisted pair electrical wire can be formed using second electrical wires 12B or third electrical wires 12C.

(1-3) Outer Sheath

As illustrated in FIG. 1, multicore cable 10 can further include an outer sheath 15 covering core 13.

Multicore cable 10 includes outer sheath 15, and thus electrical wires 12 included in core 13 disposed inside are protected, and the durability is increased.

(Resin Material)

Outer sheath 15 can be configured so as to include a resin material. The resin material is not particularly limited, but for example, it is preferable to contain a polyvinyl chloride or a polyolefin as a main component, and it is more preferable to contain a polyolefin as a main component. The definition of the main component and the polyolefin that can be suitably used have been described in insulator 122 of electrical wire 12, and thus the description thereof will be omitted.

Outer sheath 15 contains a polyvinyl chloride or a polyolefin as a main component of the resin material, and thus the flexibility of multicore cable 10 is increased, and the cost can be reduced as compared with a case where a fluororesin or the like is used as the resin material. By increasing the flexibility of multicore cable 10, the flexing resistance of multicore cable is also increased.

The resin material may be crosslinked or not crosslinked.

However, when the resin material is crosslinked, the heat resistance, strength, and corrosion resistance of multicore cable 10 can be increased. Therefore, when multicore cable 10 is used for applications that require heat resistance, strength, or corrosion resistance, the resin material is preferably crosslinked.

(Additives)

Outer sheath 15 can be configured so as to contain additives such as a flame retardant, a flame retardant aid, an antioxidant, a lubricant, a coloring agent, a reflection-imparting agent, a masking agent, a processing stabilizer, and a plasticizer, in addition to the resin material.

(1-4) Suppression Wound Layer

Multicore cable 10 of the embodiment can have a suppression wound layer 14 between core 13 and outer sheath 15. Suppression wound layer 14 can be exemplified in the form of a tape body made of an insulating material such as paper, non-woven fabric, or resin such as polyester and helically wound around the outer periphery of core 13 along the longitudinal direction of core 13.

By providing suppression wound layer 14 between core 13 and outer sheath 15, core 13 and outer sheath 15 can be prevented from being in direct contact with each other. Therefore, when electrical wire 12 is taken out at the end portion in the longitudinal direction of multicore cable 10, outer sheath 15 can be easily peeled off.

In addition, suppression wound layer 14 can be configured so as to include an oil absorptive tape. Suppression wound layer 14 includes the oil absorptive tape, and thus it is possible to suppress the oil that has entered into multicore cable 10 from further entering and coming into contact with electrical wires 12. Therefore, it is possible to suppress a decrease in the insulation resistance of electrical wires 12 included in multicore cable 10 and to increase the oil resistance.

The oil absorptive tape indicates a tape capable of absorbing oil in an amount of 10 times or more its own weight when immersed in oil.

As described above, when the tape body is wound around the outer periphery of core 13 to form suppression wound layer 14, the wound direction of the tape body can be suitably selected, and for example, may be the same direction as the twisted direction of core 13 described above, or may be a different direction.

(1-5) Metal Shielding Layer

As in multicore cable 20 illustrated in FIG. 2 or multicore cable 30 illustrated in FIG. 3, the multicore cable of the embodiment can further include a metal shielding layer 16 between outer sheath 15 and suppression wound layer 14.

Metal shielding layer 16 can be configured so as to include a conductive material.

For example, a conductive tape having a conductive layer is wound helically along the longitudinal direction of core 13, and thus metal shielding layer 16 can be formed.

In this case, the conductive tape may be formed of only the conductive layer, or may have a configuration in which the conductive layer is disposed on one or more surfaces selected from the upper surface and the lower surface of a base material.

A material used for the conductive layer is not particularly limited, but preferably contains a metal, and can be, for example, a metal foil. When the conductive layer contains a metal, the material of the metal is not particularly limited, and for example, copper, copper alloys, aluminum, aluminum alloys, or the like can be used.

The material of the base material is not particularly limited, but the base material is preferably formed of an insulating material such as an organic polymer material or a nonwoven fabric. Examples of the organic polymer material include polyester resins such as polyethylene terephthalate (PET), polyolefin resins such as polypropylene, and vinyl resins such as a polyvinyl chloride. The base material can be a base material containing an insulating material, or can be a base material formed of only an insulating material.

As described above, when metal shielding layer 16 is formed by the conductive tape wound on core 13, the wound direction of the conductive tape can be suitably selected, and for example, may be the same direction as the twisted direction of core 13 or may be a different direction.

Metal shielding layer 16 can be formed of a metal element wire. In this case, metal shielding layer 16 can be formed by arranging the metal element wires so as to have any structure selected from a braided structure and a spirally wound structure.

As a material of the metal element wire, copper, aluminum, copper alloy, or the like can be used. The metal element wire may be plated with silver or tin on its surface. Therefore, for example, a silver-plated copper alloy, a tin-plated copper alloy, or the like can be used as the metal element wire.

The multicore cable includes metal shielding layer 16, and thus it is possible to suppress signal leakage to the outside and radio wave intrusion from the outside while increasing the flexing resistance of the multicore cable. In addition, the multicore cable includes metal shielding layer 16, and thus it is possible to shield against heat from the outside and protect core 13 from the outside heat. Furthermore, the multicore cable includes metal shielding layer 16, and thus core 13 can be mechanically protected even when outer sheath 15 is damaged,

EXAMPLES

Hereinafter, the present disclosure will be described with reference to specific examples, but the present invention is not limited to such examples.

(Evaluation Method)

First, a method for the evaluation of an electrical wire manufactured in the following experimental examples will be described.

(1) Diameter of Element Wire, Outer Diameter, and Thickness of Each Layer

The diameter of the element wire used for the conductor and the outer diameter of each portion were obtained by measuring lengths of two diameters orthogonal to each other in each portion to be measured in a selected cross-section perpendicular to the longitudinal direction of the element wire or the multicore cable and averaging the measured values.

The thickness of each layer, for example, the thickness of outer sheath 15 illustrated in Table 2, was obtained by subtracting the outer diameter of suppression wound layer 14, which is a layer that is in contact with outer sheath 15 and is positioned inside outer sheath 15, from the outer diameter of outer sheath 15 and dividing the result by two. Similarly, the thickness of the insulator included in each electrical wire was obtained by subtracting the outer diameter of the conductor, which is a layer that is in contact with the insulator and is positioned inside the insulator, from the outer diameter of the insulator and dividing the result by two.

(2) Twist Pitch

In the measurement of the twist pitch, the other covering members are removed so that the layer to be measured among the layers of the core is exposed. Next, the twist pitch of each layer was measured in accordance with JIS C 3005 (2014), and the ratios of the twist pitches of the layers were calculated. Each of the ratios of the twist pitches of the layers included in the core is indicated in the column of "twist pitch ratio" of Table 1.

(3) Oil Resistance

The oil resistance test was carried out according to the following procedure.

The multicore cable manufactured in each experimental example was immersed in oil for 20 hours. Next, the multicore cable was taken out from the oil, and the insulation resistances of the insulators of all the electrical wires included in the multicore cable were measured in accordance with JIS C 3005 (2014). The multicore cable was evaluated as A when the insulating resistances of all the electrical wires included in the multicore cable were equal to or greater than 10 MΩ·km, and was evaluated as B when the insulating resistances of all the electrical wires included in the multicore cable were equal to or greater than 9 MΩ·km and less than 10 MΩ·km. The multicore cable was evaluated as C when the insulating resistances of at least some of the electrical wires included in the multicore cable were less than 9 MΩ·km.

The multicore cable can be evaluated as having the excellent oil resistance when the evaluation result of the oil resistance test is A, and the oil resistance decreases in the order of the evaluation results B and C. When the evaluation result of the oil resistance is A or B, the multicore cable can be evaluated as having sufficient oil resistance. When the evaluation result of the oil resistance is C, the multicore cable can be evaluated as having insufficient oil resistance.

(4) Flexing Resistance

The flexing resistance test was performed according to the following procedure.

Figure 4:
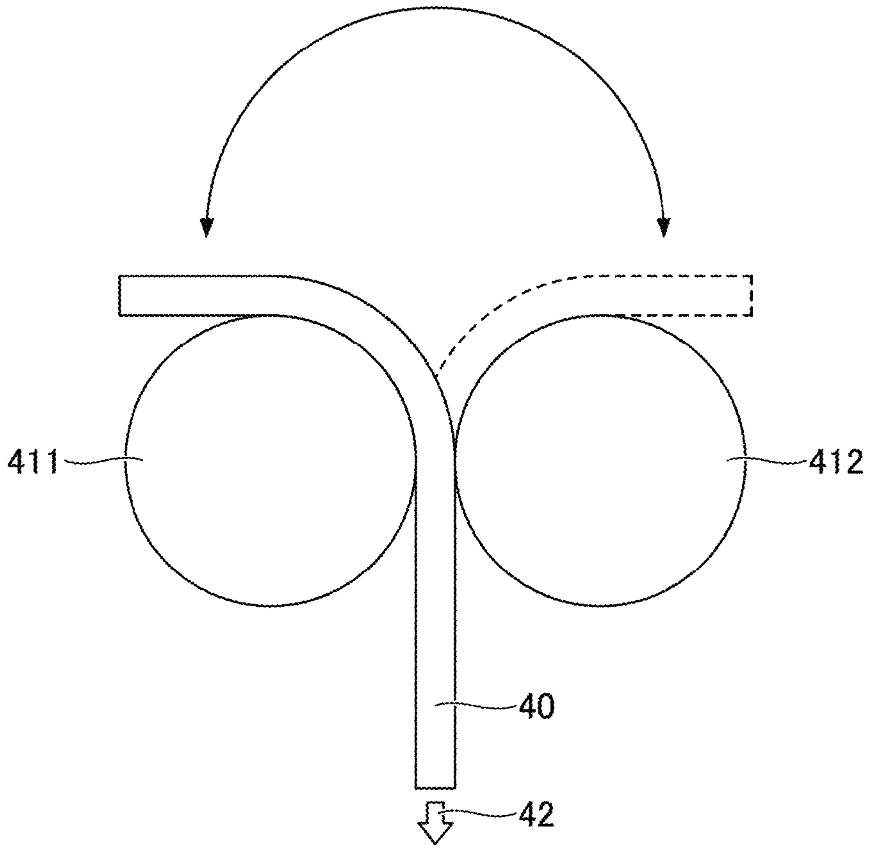
FIG. 4 is an illustration of a method for the evaluation of the flexing resistance.

As illustrated in FIG. 4, a multicore cable 40 to be evaluated is vertically positioned and sandwiched between two of a first mandrel 411 and a second mandrel 412 that are horizontally arranged parallel to each other and that have a diameter of 60 mm. Then, multicore cable 40 is horizontally bent by 90° so that an upper end of multicore cable 40 comes in contact with an upper side of first mandrel 411, and then is horizontally bent by 90° so that the upper end of multicore cable 40 comes in contact with an upper side of second mandrel 412, and this operation was repeated. This repetition is performed while measuring the resistance values of the conductors of all electrical wires in the multicore cable, and the number of bending times when, for any one of the electrical wires, the resistance increases to 10 times or more than the initial resistance value is adopted as an index value of the flexing resistance test. The number of bending times evaluated in the above-described flexing resistance test is counted as one, each time multicore cable 40 is bent to the left in FIG. 4, is bent to the right, and then is bent to the left to be returned. Here, during the flexing resistance test, a load of 5 N is applied to multicore cable 40 downward along a block arrow 42 in FIG. 4.

The evaluation result was A when the index value of the flexing resistance test, that is, the number of bending times was 50,000 times or more, the evaluation result was B when the number of bending times was 40,000 times or more and less than 50,000 times, and the evaluation result was C when the number of times of bending was less than 40,000 times.

The multicore cable can be evaluated as having the excellent flexing resistance when the evaluation result of the flexing resistance test is A, and the flexing resistance decreases in the order of the evaluation results B and C. When the evaluation result of the flexing resistance test is A or B, the multicore cable can be evaluated as a multicore cable having sufficient flexing resistance. When the evaluation result of the flexing resistance test is C, the multicore cable can be evaluated as a multicore cable having insufficient flexing resistance.

The multicore cable in each experimental example will be described below.

The experimental examples 1 to 5 are the examples of the present disclosure, and the experimental examples 6, 7, and 8 are comparative examples.

Experimental Example 1

As indicated in the row of the configuration of multicore cable in Table 1, a multicore cable A having the same structure as multicore cable 10 illustrated in FIG. 1 in the cross-section perpendicular to the longitudinal direction was manufactured.

The configuration of the multicore cable A is indicated in Table 2, and the configuration of an electrical wire A included in the core of the multicore cable A is indicated in Table 3.

The evaluation results are indicated in Table 1.

Experimental Example 2

A multicore cable B having the same structure as multicore cable 30 illustrated in FIG. 3 in the cross-section perpendicular to the longitudinal direction was manufactured.

The configuration of the multicore cable B is indicated in Table 4, and the configuration of an electrical wire B included in the core of the multicore cable B is indicated in Table 5. As indicated in Table 5, the electrical wire B includes a first electrical wire, a second electrical wire, and a third electrical wire having different configurations, and the first electrical wires are twisted together so as to form a twisted pair electrical wire.

The evaluation results are indicated in Table 1.

Experimental Example 3

A multicore cable C having the same structure as multicore cable 10 illustrated in FIG. 1 in a cross-section perpendicular to a longitudinal direction, except that the number of electrical wires included in core 13 was different was manufactured.

The configuration of the multicore cable C is indicated in Table 6, and the configuration of an electrical wire C included in the core of the multicore cable C is indicated in Table 7.

The evaluation results are indicated in Table 1.

Experimental Example 4, Experimental Example 5, Experimental Example 7, and Experimental Example 8

Each multicore cable was manufactured under the same conditions as in Experimental Example 1 except that the twist pitch of each layer of core 13 was set to have the twist pitch ratio indicted in Table 1, and evaluations were performed.

The evaluation results are indicated in Table 1.

Experimental Example 6

A multicore cable was manufactured under the same conditions as in Experimental Example 1 except that a PP string (a cord made of polypropylene) was used as the material of the oil absorptive interposition, and evaluation was performed.

The PP string has an oil absorption amount of less than 10 times its own weight and has no oil absorption property. Therefore, the term "interposition" can be used instead of "oil absorptive interposition".

The evaluation results are indicated in Table 1.

TABLE 1

| | | EXPERIMENTAL EXAMPLE 1 | EXPERIMENTAL EXAMPLE 2 | EXPERIMENTAL EXAMPLE 3 | EXPERIMENTAL EXAMPLE 4 | EXPERIMENTAL EXAMPLE 5 | EXPERIMENTAL EXAMPLE 6 | EXPERIMENTAL EXAMPLE 7 | EXPERIMENTAL EXAMPLE 8 |
|---|---|---|---|---|---|---|---|---|---|
| MULTICORE CABLE | CONFIGURATION | A | B | C | A | A | A | A | A |
| OIL ABSORPTIVE INTERPOSITION | MATERIAL | STAPLE YARNS | STAPLE YARNS | STAPLE YARNS | STAPLE YARNS | STAPLE YARNS | PP STRING | STAPLE YARNS | STAPLE YARNS |
| TWIST PITCH RATIO | INNERMOST LAYER PI/ INTERMEDIATE LAYER PM | 0.64 | 0.67 | 0.63 | 0.69 | 0.74 | 0.64 | 0.50 | 1.09 |
| | INTERMEDIATE LAYER PM/ OUTERMOST LAYER PO | 0.88 | 0.75 | 0.74 | 0.65 | 0.95 | 0.88 | 0.70 | 0.75 |
| | INNERMOST LAYER PI/ OUTERMOST LAYER PO | 0.56 | 0.50 | 0.46 | 0.45 | 0.70 | 0.56 | 0.35 | 0.82 |
| EVALUATION RESULT | OIL RESISTANCE | A | A | A | B | A | C | C | A |
| | FLEXING RESISTANCE | A | A | A | A | B | A | A | C |

TABLE 2

| | | | | | |
|---|---|---|---|---|---|
| CONFIGURATION OF MULTICORE CABLE A | CORE | THE NUMBER OF ELECTRICAL WIRES A | INNERMOST LAYER | WIRES | 8 |
| | | | INTERMEDIATE LAYER | WIRES | 14 |
| | | | OUTERMOST LAYER | WIRES | 20 |

TABLE 2-continued

| | | | |
|---|---|---|---|
| SUPPRESSION WOUND LAYER | MATERIAL | | NON-WOVEN FABRIC TAPE |
| | CONFIGURATION | | SINGLE LAYER WOUND |
| OUTER SHEATH | MATERIAL | | POLYVINYL CHLORIDE |
| | THICKNESS | mm | 1.4 |
| | OUTER DIAMETER | mm | 26.1 |

TABLE 3

| | | | | | |
|---|---|---|---|---|---|
| ELECTRICAL WIRE A | CONDUCTOR | MATERIAL | | | TIN-PLATED SOFT COPPER WIRE |
| | | CONFIGURATION | THE NUMBER OF ELEMENT WIRES | WIRES | 37 |
| | | | DIAMETER OF ELEMENT WIRE | mm | 0.26 |
| | | OUTER DIAMETER | | mm | 1.8 |
| | INSULATOR | MATERIAL | | | POLYVINYL CHLORIDE |
| | | THICKNESS | | mm | 0.6 |
| | | OUTER DIAMETER | | mm | 3 |

TABLE 4

| | | | | | |
|---|---|---|---|---|---|
| CONFIGURATION OF MULTICORE CABLE B | CORE | CONFIGURATION OF ELECTRICAL WIRE B | INNERMOST LAYER | TYPE OF ELECTRICAL WIRE | FIRST ELECTRICAL WIRE |
| | | | | WIRES | 6 |
| | | | INTERMEDIATE LAYER | TYPE OF ELECTRICAL WIRE | SECOND ELECTRICAL WIRE |
| | | | | WIRES | 12 |
| | | | OUTERMOST LAYER | TYPE OF ELECTRICAL WIRE | THIRD ELECTRICAL WIRE |
| | | | | WIRES | 24 |
| | SUPPRESSION WOUND LAYER | MATERIAL | | | THIN PAPER TAPE |
| | | CONFIGURATION | | | SINGLE LAYER WOUND |
| | METAL SHIELDING LAYER | MATERIAL | | | TIN-PLATED SOFT COPPER WIRE |
| | | CONFIGURATION | | | BRAIDED |
| | OUTER SHEATH | MATERIAL | | | POLYVINYL CHLORIDE |
| | | THICKNESS | | mm | 1.2 |
| | | OUTER DIAMETER | | mm | 14.2 |

TABLE 5

| ELECTRICAL WIRE B | | | | FIRST ELECTRICAL WIRE | SECOND ELECTRICAL WIRE | THIRD ELECTRICAL WIRE |
|---|---|---|---|---|---|---|
| CONDUCTOR | MATERIAL | | | TIN-PLATED SOFT COPPER WIRE | | |
| | CONFIGURATION | THE NUMBER OF ELEMENT WIRES | WIRES | 40 | 30 | 40 |
| | | DIAMETER OF ELEMENT WIRE | mm | 0.08 | 0.18 | 0.08 |
| | OUTER DIAMETER | | mm | 0.58 | 1.15 | 0.58 |
| INSULATOR | MATERIAL | | | POLYVINYL CHLORIDE | | |
| | THICKNESS | | mm | 0.26 | 0.275 | 0.26 |
| | OUTER DIAMETER | | mm | 1.1 | 1.7 | 1.1 |

TABLE 6

| | | | | | |
|---|---|---|---|---|---|
| CONFIGURATION OF MULTICORE CABLE C | CORE | THE NUMBER OF ELECTRICAL WIRES C | INNERMOST LAYER | WIRES | 4 |
| | | | INTERMEDIATE LAYER | WIRES | 10 |
| | | | OUTERMOST LAYER | WIRES | 16 |
| | SUPPRESSION WOUND LAYER | MATERIAL | | | THIN PAPER TAPE |
| | | CONFIGURATION | | | SINGLE LAYER WOUND |
| | OUTER SHEATH | MATERIAL | | | POLYETHYLENE |
| | | THICKNESS | | mm | 1.4 |
| | | OUTER DIAMETER | | mm | 15.7 |

TABLE 7

| | | | | | |
|---|---|---|---|---|---|
| ELECTRICAL WIRE C | CONDUCTOR | MATERIAL | | | TIN-PLATED SOFT COPPER WIRE |
| | | CONFIGURATION | THE NUMBER OF ELEMENT WIRES | WIRES | 50 |
| | | | DIAMETER OF ELEMENT WIRE | mm | 0.18 |
| | | OUTER DIAMETER | | mm | 1.47 |
| | INSULATOR | MATERIAL | | | POLYETHYLENE |
| | | THICKNESS | | mm | 0.265 |
| | | OUTER DIAMETER | | mm | 2.0 |

What is claimed is:

1. A multicore cable comprising:

an oil absorptive interposition; and a core disposed to surround the oil absorptive interposition and including electrical wires, the electrical wires being twisted together, wherein, in a cross-section perpendicular to a longitudinal direction of the core, the core has layers in which the electrical wires are arranged on circumferences, and an innermost layer of the layers is closest to the oil absorptive interposition, wherein a twist pitch of the electrical wires in the innermost layer is greater than or equal to 0.45 times and less than 0.8 times a twist pitch of the electrical wires in an outermost layer of the layers, wherein the core has three or more of the layers made up of the electrical wires, and wherein a twist pitch of the electrical wires in an intermediate layer is greater than or equal to 0.7 times and less than 0.95 times the twist pitch of the electrical wires in the outermost layer, the intermediate layer being adjacent to the outermost layer and being disposed at a position closer to the oil absorptive interposition than the outermost layer is.

2. The multicore cable according to claim 1, wherein the electrical wires each include a conductor and an insulator covering the conductor, and wherein the insulator contains a resin material whose main component is a polyvinyl chloride or a polyolefin.

3. The multicore cable according to claim 1, further comprising:

an outer sheath covering the core, wherein the outer sheath contains a resin material whose main component is a polyvinyl chloride or a polyolefin.

4. The multicore cable according to claim 3, further comprising:

a suppression wound layer between the core and the outer sheath, wherein the suppression wound layer includes an oil absorptive tape.

5. The multicore cable according to claim 4, further comprising:

a metal shielding layer between the outer sheath and the suppression wound layer.

* * * * *